(12) United States Patent
Davidescu et al.

(10) Patent No.: US 10,402,353 B2
(45) Date of Patent: Sep. 3, 2019

(54) SYSTEM AND METHOD FOR PROCESSING INTERRUPTS BY PROCESSORS OF A MICROCONTROLLER IN A LOW-POWER MODE

(71) Applicant: STMicroelectronics (Rousset) SAS, Rousset (FR)

(72) Inventors: Dragos Davidescu, Lambesc (FR); Sandrine Lendre, Pourrières (FR); Olivier Ferrand, Aix-en-Provence (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 15/701,003

(22) Filed: Sep. 11, 2017

(65) Prior Publication Data

US 2018/0189205 A1    Jul. 5, 2018

(30) Foreign Application Priority Data

Jan. 4, 2017 (FR) ...................................... 17 50058

(51) Int. Cl.

| | |
|---|---|
| *G06F 13/16* | (2006.01) |
| *G06F 1/3234* | (2019.01) |
| *G06F 1/3293* | (2019.01) |
| *G06F 13/24* | (2006.01) |

(52) U.S. Cl.
CPC ........ *G06F 13/1673* (2013.01); *G06F 1/3243* (2013.01); *G06F 1/3293* (2013.01); *G06F 13/24* (2013.01); *Y02D 10/122* (2018.01); *Y02D 10/152* (2018.01)

(58) Field of Classification Search
CPC combination set(s) only.
See application file for complete search history.

(56) References Cited

U.S. PATENT DOCUMENTS

| | | | |
|---|---|---|---|
| 7,051,138 B2* | 5/2006 | Yang ...................... | G06F 13/24 710/260 |
| 7,725,749 B2* | 5/2010 | Mitarai ................. | G06F 1/3203 713/323 |
| 9,009,508 B2* | 4/2015 | Beck ..................... | G06F 1/3203 713/320 |
| 2005/0060461 A1 | 3/2005 | Yang | |
| 2007/0245164 A1 | 10/2007 | Mitarai | |
| 2014/0068289 A1 | 3/2014 | Beck | |
| 2016/0196141 A1 | 7/2016 | Deshpande et al. | |

* cited by examiner

*Primary Examiner* — Raymond N Phan
(74) *Attorney, Agent, or Firm* — Slater Matsil, LLP

(57) ABSTRACT

An embodiment system includes a first processor configured to process a suite of instructions and a second processor configured to process a subset of the suite of instructions. The system further includes a power management circuit configured to select the first processor or the second processor as a selected processor, the power management circuit being further configured to activate the selected processor or place the selected processor on standby. The system also includes a first peripheral device configured to generate a first interrupt signal, a switch configured to direct the first interrupt signal to the selected processor, and a first memory configured to store a first interrupt routine associated with the first interrupt signal, the selected processor being configured to execute the first interrupt routine in response to the first interrupt signal.

21 Claims, 3 Drawing Sheets

SYSTEM AND METHOD FOR PROCESSING INTERRUPTS BY PROCESSORS OF A MICROCONTROLLER IN A LOW-POWER MODE

CROSS-REFERENCE TO RELATED APPLICATIONS

This application claims priority to French Patent Application No. 1750058, filed on Jan. 4, 2017, which application is hereby incorporated herein by reference.

TECHNICAL FIELD

The present disclosure relates generally to data processing devices, for example, microcontrollers, and in particular embodiments, to a system and method for operating a microcontroller.

BACKGROUND

A goal in the manufacture of electronic equipment is the decrease of electrical consumption in the manufactured electronic equipment. This is particularly true in fields where an infrequent need for recharging is an advantage, such as, for example, in the field of mobile telephony.

In periods of high activity, the power consumption of processors may be high. In periods of low activity, for example, in standby periods, power consumption may drop significantly (e.g. compared to power consumption during periods of high activity). However, even in periods of low activity, leakage currents remain, which then form a significant share of the total power consumption of the processor in periods of low activity. The total value of these leakage currents may be related to the number of transistors present in the processor and is, therefore, all the more significant when the computational power of the processor is great, that is to say, when the processor possesses a large number of transistors.

To attenuate energy loss during periods of low activity, the leakage currents may, for example, be decreased by lowering the supply current when on standby. It would, nonetheless, be desirable to further decrease the consumption of the processor in periods of low activity.

SUMMARY

Thus, an embodiment provides a system including a first and a second processor, the second being capable of processing only a subset of the suite of instructions processable by the first; a power management circuit suitable for selecting one or the other of the first and second processors and for rendering it active or placing it on standby; a first peripheral suitable for generating an interrupt signal; a switch suitable for directing the interrupt signal either to the first processor, or to the second processor, according to which one is selected; and a first memory suitable for storing an interrupt routine associated with the interrupt signal, the active processor being suitable for executing this interrupt routine in response to the interrupt signal.

According to an embodiment, the power management circuit is suitable for generating a signal applied to the switch to control the selection of the processor.

According to an embodiment, the system includes several other peripherals, certain of which are suitable for generating an interrupt signal.

According to an embodiment, the second processor is not able to receive interrupt signals generated by all or some of the other peripherals.

According to an embodiment, the system includes a second memory accessible by the first processor and containing an interrupt vector providing the address, in the first memory, of the interrupt routine associated with the first peripheral.

According to an embodiment, the first memory is a volatile memory and the second memory is a non-volatile memory.

According to an embodiment, the second memory is suitable for storing data to be copied in the first memory, the said data comprising the interrupt routine and the interrupt vector associated with the first peripheral.

According to an embodiment, the second processor is of smaller size than the first processor.

An embodiment provides a mobile device including the system hereinabove.

An embodiment provides a method for actuating a system including a first processor, a second processor, a first memory and a first peripheral. The method includes selecting, via a power management circuit, the second processor capable of processing a first suite of instructions or the first processor capable of processing a subset of the first suite of instructions; rendering active or placing on standby, via a power management circuit, the selected processor; generating, via a peripheral, an interrupt signal that is able to be processed by each of the first and second processors; directing the interrupt signal to the processor selected from among the first and second processors; and accessing, via the selected processor, an interrupt routine contained in the first memory and associated with the interrupt signal and processing it.

According to an embodiment, the method further includes: accessing, via the first processor, in response to the interrupt signal, an interrupt vector which is stored in a second memory and which provides the address, in the first memory, of the interrupt routine.

BRIEF DESCRIPTION OF THE DRAWINGS

These characteristics and advantages, as well as others, will be set forth in detail in the following non-limiting description of particular embodiments which is given in conjunction with the attached figures, among which.

DETAILED DESCRIPTION OF ILLUSTRATIVE EMBODIMENTS

For the sake of clarity, only the elements useful for the understanding of the embodiments described have been represented and are detailed. For example, certain components of the microcontroller of FIGS. 1A and 1B are not represented.

Figure 1A:
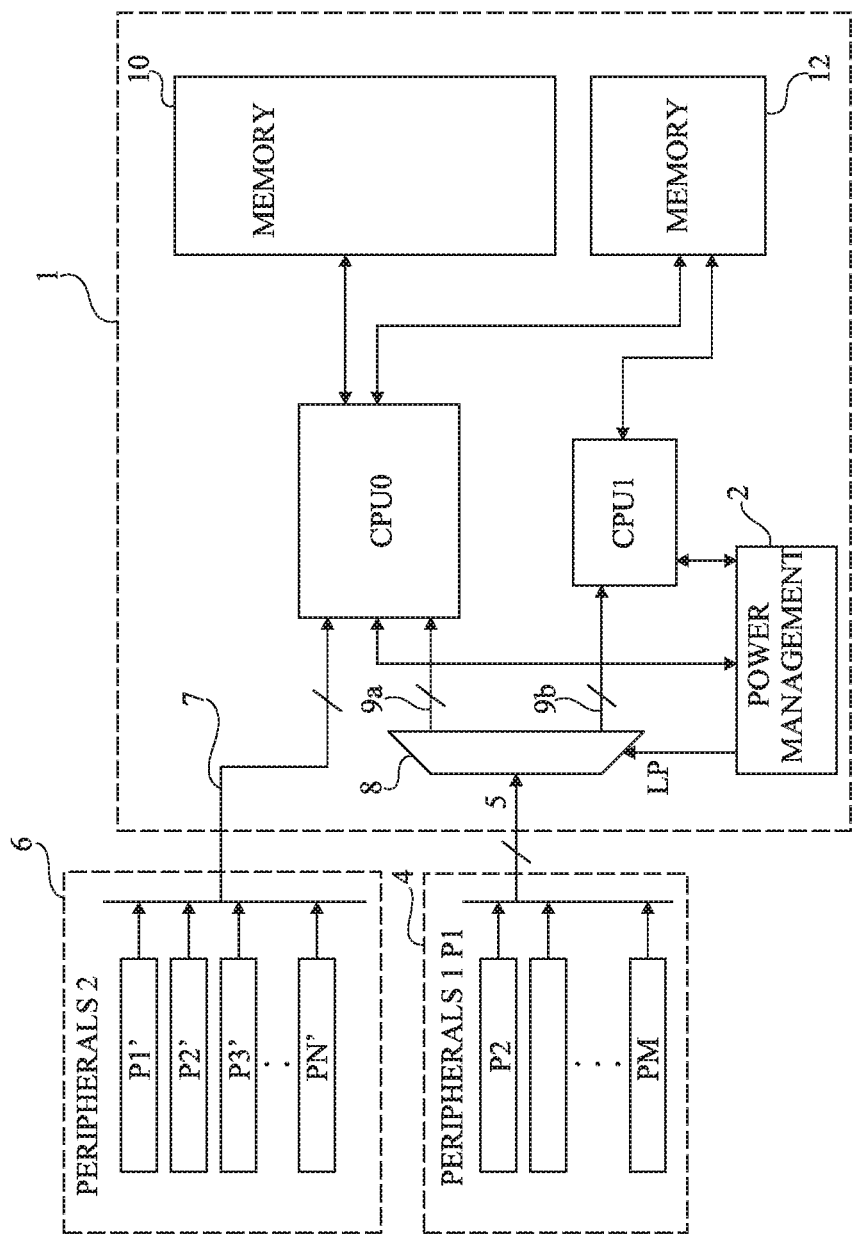
FIGS. 1A and 1B show schematic views of an embodiment of a system including a microcontroller.
Figure 1B:
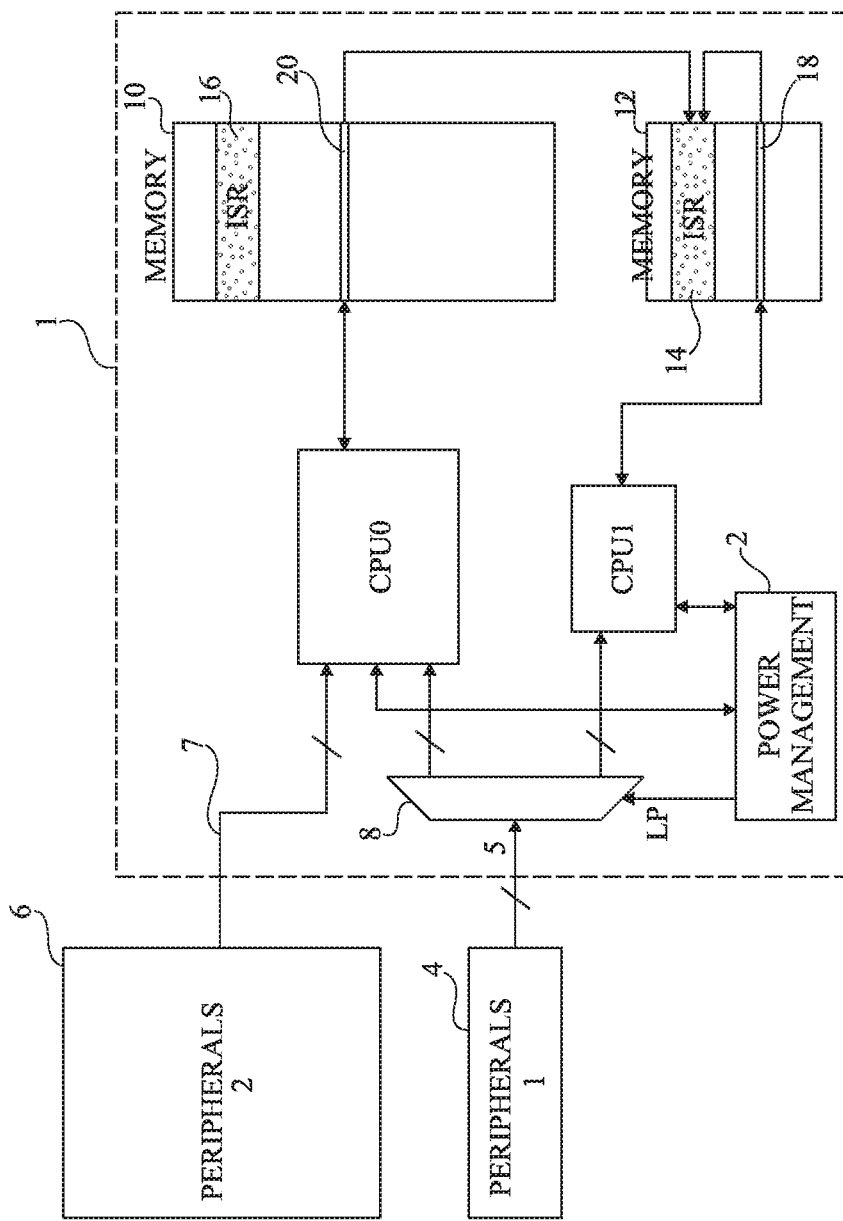

FIG. 1A represents schematically and partially an embodiment of a system including a data processing device 1, for example, a microcontroller 1. The microcontroller 1 includes two processors CPU0 and CPU1. The processor CPU1 is of a smaller size than the processor CPU0. The processor CPU0 is a main processor of the microcontroller 1. The processor CPU0 possesses a relatively high computational power. In other words, the processor CPU0 includes a large number of transistors (e.g., compared to processor CPU1), corresponding, for example, to a number of logic gates of between 150,000 and 200,000. The processor CPU0 can thus manage a relatively broad suite of instructions. The processor CPU1 is an auxiliary processor of the microcontroller 1. It possesses a relatively low computational power. In other words, the processor CPU1 includes a relatively smaller number of transistors (e.g., compared to processor CPU0), corresponding, for example, to between 20,000 and 50,000 logic gates. The processor CPU1 can manage a smaller suite of instructions than that processed by the processor CPU0. The suite of instructions manageable by the processor CPU1 is a subset of (e.g., a proper subset of) the suite of instructions manageable by the processor CPU0.

The processor CPU0 may be, for example, a Cortex-M4 processor from Advanced RISC Machines (ARM). The processor CPU1 may for example be a Cortex-M0 processor from ARM.

The microcontroller 1 may include a power management block 2. The power management block 2 is coupled (e.g. communicatively and/or electrically coupled) to the two processors CPU0, CPU1 and is configured to activate and deactivate the processors CPU0 and CPU1 in such a way that the two processors CPU0, CPU1 are not generally active at the same time. The power management block 2 is, moreover, configured to generate a low power signal (indicated in FIG. 1A as signal LP). The signal LP takes a first value when the processor CPU0 is active or on standby and the processor CPU1 is deactivated. The signal LP takes a second value, different from the first value, when the system is in the low power operating mode, that is to say, when the processor CPU0 is deactivated and the processor CPU1 is active or on standby. As such, in the low power operating mode, the main processor CPU0 is deactivated while the auxiliary processor CPU1 is active or on standby.

The microcontroller 1 is coupled (e.g. communicatively and/or electrically coupled) to a first group of peripheral devices 4 (hereinafter referred to as "the first group of peripherals 4") and a second group of peripheral devices 6 (hereinafter referred to as "the second group of peripherals 6"). The first group of peripherals 4 includes M peripheral devices P1 to PM, including at least one peripheral device being configured to generate interrupt signals. These interrupt signals are provided on output lines 5 of the first group of peripherals 4. The second group of peripherals 6 includes N peripherals P1' to PN', including at least one peripheral being configured to generate interrupt signals. These interrupt signals are provided on output lines 7 of the second group of peripherals 6. Although not represented in FIG. 1A, certain peripherals of the first group 4 can generate interrupt signals that are configured to be processed by the processor CPU0 (and not by the processor CPU1), for example to force the activation of the processor CPU0.

The peripherals of the first group 4 are coupled to the two processors CPU0 and CPU1 through a switch 8 (e.g. a multiplexer). The switch 8 includes inputs receiving the output lines 5. The switch 8 also includes first outputs 9a, second outputs 9b and a control input, which control input receives the signal LP generated by the power management block 2. The first outputs 9a of the switch 8 are coupled to the processor CPU0 and the second outputs 9b of the switch 8 are coupled to the processor CPU1. If the signal LP is at the first value, the processor CPU0 is selected and the switch 8 transfers a signal present on one of the lines at its inputs to a corresponding one of the lines at its first outputs 9a. If the signal LP is at the second value, the processor CPU1 is selected and the switch 8 transfers the signal present on one of the lines at its inputs to a corresponding one of the lines at its second outputs 9b. Thus, if the processor CPU0 is active or on standby, the signal LP is at the first value and the processor CPU0 receives the interrupt signals originating from the peripherals of the first group 4. However, when the microcontroller 1 passes to a low power mode, the processor CPU0 is deactivated, the signal LP takes the second value, and the interrupt signals originating from the peripherals of the first group 4 are processed by the processor CPU1. As depicted in the example of FIG. 1A, the peripherals of the second group 6 are coupled to the processor CPU0, but not to the processor CPU1. The peripherals of the first group 4 and the second group 6 may, for example, be timers, diverse sensors, such as pressure sensors, temperature sensors, MEMS devices, etc. One of the peripherals (e.g. of the first group 4 or the second group 6) can be a communication system allowing reception and transmission of data between the microcontroller 1 and another device.

The microcontroller 1 includes, for example, a main memory block 10 accessible by the processor CPU0. The microcontroller 1 also includes, for example, an auxiliary memory block 12 accessible to both processors CPU0 and CPU1. Thus, the main memory block 10 is accessible by the main processor CPU0, but not by the processor CPU1, while the auxiliary memory block 12 is accessible by both processors CPU0 and CPU1. In this exemplary embodiment, the main memory block 10 is a nonvolatile memory, for example a so-called "Flash" memory, and the auxiliary memory block 12 is a volatile memory, for example a so-called "SRAM" memory.

FIG. 1B represents the system of FIG. 1A in a simplified manner. In particular, the groups of peripherals 4 and 6 are represented in the form of two simplified blocks 4 and 6.

Every time the system is booted, the auxiliary memory block 12 is empty of any data. Codes are copied to the auxiliary memory block 12 from the main memory block 10. The auxiliary memory block 12 is kept powered-up so that the data that it contains are preserved for whichever processor is active. In particular, the auxiliary memory block 12 contains interrupt routines 14 (Interrupt Service Routines, commonly known as ISRs), associated with the peripherals of the first group 4. The interrupt routines 14 have been copied from a location 16 in the main memory block 10. Likewise, the interrupt vectors associated with the peripherals of the first group 4 are copied to a location 18 of the auxiliary memory block 12 from a location 20 of the main memory block 10.

The main memory block 10 also contains the interrupt vectors and interrupt routines associated with the peripherals of the second group 6. Other codes may optionally be copied to the auxiliary memory block 12, for example, initialization codes for the processor CPU1. Since the processor CPU1 has access only to the auxiliary memory block 12, the initialization codes are, for example, transferred to the auxiliary memory block 12 before activating the processor CPU1.

When an interrupt is generated by a peripheral of the first group 4, the interrupt is processed by the processor selected according to the signal LP generated by the power management circuit 2. The processor CPU0, when it is selected, processes the interrupt routine, associated with the interrupt generated by the peripheral of the first group 4 in a similar manner as the processor CPU1 would when the processor CPU1 is selected. This operation is described in greater detail in conjunction with the flow chart shown in FIG. 2.

An interrupt generated by a peripheral of the second group 6 can only be processed if the processor CPU0 is active or on standby (e.g. since the second group of peripherals 6 is coupled to the processor CPU0, but not to the processor CPU1). The peripherals of the second group 6 may, for example, be deactivated during the deactivation of the processor CPU0 to avoid energy losses.

When an interrupt is generated by a peripheral of the second group 6, an interrupt signal i is dispatched to the processor CPU0 (e.g. via output lines 7). The peripheral from which the interrupt i arises determines the interrupt vector (not represented in the figures), stored in the main memory block 10, that is to be read by the processor CPU0. The interrupt vector contains the address at which the interrupt routine, to be executed by the processor CPU0 in response to the interrupt i, is located. Thereafter, the processor CPU0 accesses, via the address obtained, the interrupt routines likewise situated in the main memory block 10 so as to process them.

Figure 2:
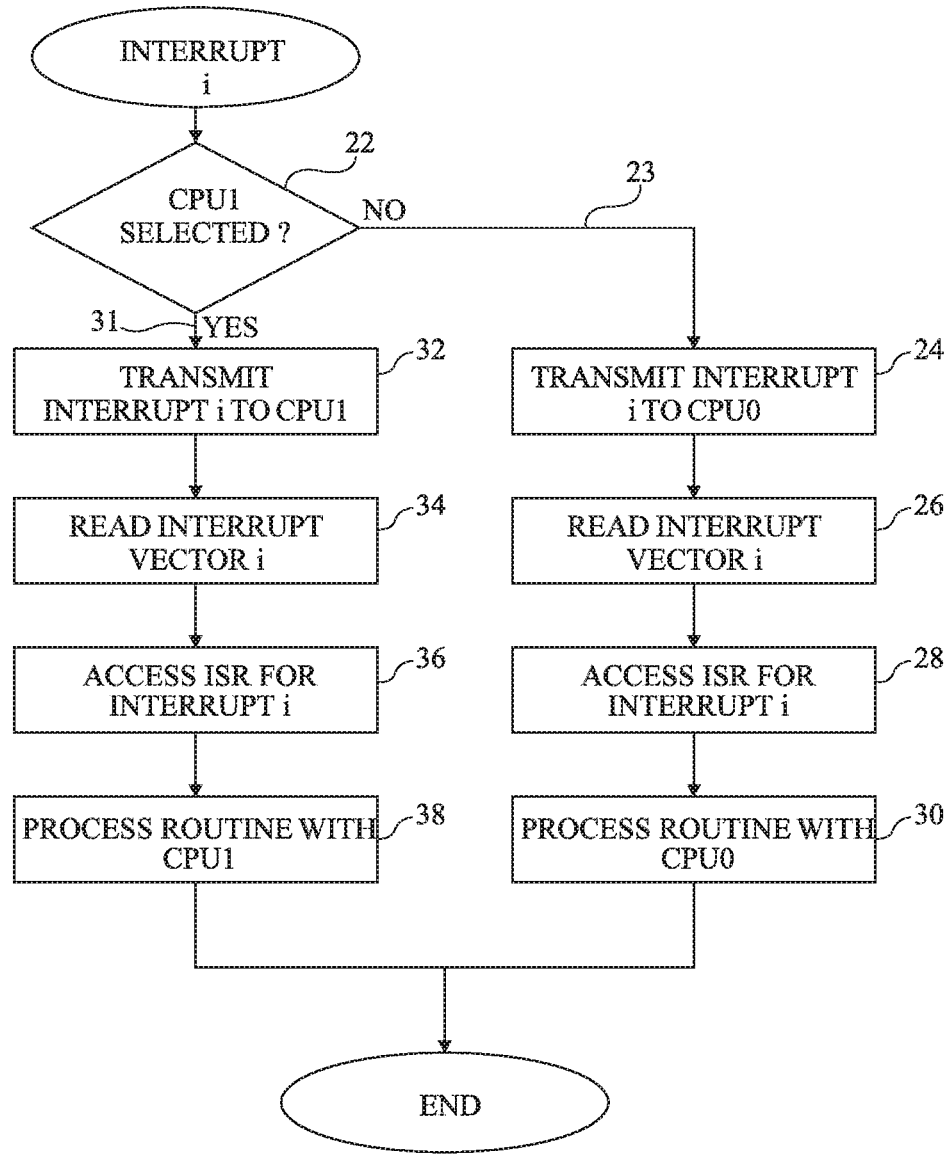
FIG. 2 illustrates a flow chart depicting an embodiment method of operating the system of FIGS. 1A and 1B.

FIG. 2 shows a flow chart illustrating the operation of the systems shown in FIGS. 1A and 1B in an embodiment where an interrupt is generated by a peripheral of the first group 4.

When an event occurs at one of the peripherals of the first group 4, an interrupt signal i is dispatched to the switch 8 (e.g. via output lines 5). In a step 22, it is determined whether the processor CPU1 is selected, according to the value of the signal LP provided to the switch 8 by the power management block 2.

If the signal LP is at the first value, that is to say, the processor CPU1 is not selected (branch 23: NO), the main processor CPU0 is selected and the interrupt signal i is transmitted to the processor CPU0 (step 24). The processor CPU0 thereafter accesses the interrupt vector corresponding to the interrupt signal i received (step 26). This interrupt vector is located (e.g. stored) at the location 20, itself located, for example, in the memory block 10. This interrupt vector contains the address at which the interrupt routine associated with the interrupt i accessed by the processor (step 28) is located. This interrupt routine is located among the routines 14 stored in the memory block 12. This routine includes instructions which are thereafter executed by the processor CPU0 (step 30). In this case, operation is similar to the operation of the system when the interrupt arises from a peripheral of the second group 6. A difference is that the interrupt routines associated with the first group of peripherals 4 are stored in the auxiliary memory block 12, and not in the main memory block 10.

If the signal LP is at the second value, that is to say the processor CPU1 is selected (branch 31: YES), the system is in low power mode and the active processor is the auxiliary processor CPU1. The interrupt signal i is transmitted to the processor CPU1 (step 32). The processor CPU1 accesses the interrupt vector associated with the interrupt signal i (step 34). The interrupt vector is located (e.g. stored) at the location 18, in the memory block 12. The interrupt vector contains the address of the interrupt routine corresponding to the interrupt signal i allowing the processor CPU1 to access this routine (step 36). For one and the same interrupt signal i, this is the same routine as the routine processed in step 28. The processor CPU1 can then execute the routine (step 38). If the routine requires greater computational power than that of the processor CPU1, the processor CPU0 may, for example, be activated.

In periods of low activity, during periods separating diverse interrupts, low computational power is sufficient to keep the system in operation. The computational power of a processor affects the electrical power consumption of a system, most particularly during the periods of low activity. As such, the main processor CPU0 brings about, if it is kept active, high power consumption for unnecessary computational power. The processor CPU1 possesses computational power sufficient for operation during a period of low activity, and lower power consumption.

During an interrupt, the use of the processor CPU1, if it is sufficient for processing the interrupt, makes it possible to maintain low electrical consumption. If the routine associated with this interrupt so provides, the processor CPU0 is activated but remains for example active only during the period required for processing the interrupt.

Thus, the electrical power consumption of the system, during long periods of low activity interspersed with management of interrupts, is decreased.

An advantage of the system described here, and of its mode of operation, resides not only in energy savings but also in simplicity of coding. The interrupt routines 14 are identical and in the same memory space whichever processor is active. Thus, during programming, it is not necessary for the designer of the code to take into consideration the processor that will access the interrupt routines. The designer compiles the interrupt routines associated with the peripherals of the first group 4 with the suite of instructions of the processor CPU1. The coding time of the system described is less than the coding time of two processors each having its own code.

Particular embodiments have been described. Diverse variants and modifications will be apparent to the person skilled in the art. In particular, the auxiliary memory block 12, accessible by both processors CPU0 and CPU1, can be a type of volatile memory other than an SRAM memory, or can be a nonvolatile memory. In the case of a nonvolatile memory, the writing of the codes and data related to the operation of the auxiliary processor CPU1 and related to the management of the peripherals of the first group 4, in this nonvolatile memory, is done only once and not every time the system is booted. Likewise, the main memory block 10 can be a type of nonvolatile memory other than a Flash memory. The memory blocks 10 and 12 can also be just a single memory.

What is claimed is:

1. A system, comprising:
   a first processor configured to process a suite of instructions;
   a second processor configured to process a subset of the suite of instructions;
   a power management circuit configured to select the first processor or the second processor as a selected processor, the power management circuit being further configured to activate the selected processor or place the selected processor on standby;
   a first peripheral device configured to generate a first interrupt signal;
   a switch configured to direct the first interrupt signal to the selected processor;
   a first memory configured to store a first interrupt routine associated with the first interrupt signal, the selected processor being configured to execute the first interrupt routine in response to the first interrupt signal; and
   a second memory accessible by the first processor and configured to store an interrupt vector providing an address, in the first memory, of the first interrupt routine associated with the first peripheral device, wherein the second memory is configured to store data to be copied in the first memory, the data comprising the first interrupt routine and the interrupt vector providing the address of the first interrupt routine associated with the first peripheral device, and wherein the first interrupt routine and the interrupt vector are copied from the second memory to the first memory in response to a system boot.

2. The system according to claim 1, wherein the power management circuit is configured to generate a signal that is applied to the switch to control selection of the selected processor.

3. The system according to claim 1, further comprising a second peripheral device configured to generate a second interrupt signal.

4. The system according to claim 1, wherein the first memory is a volatile memory and the second memory is a non-volatile memory.

5. The system according to claim 1, wherein the second memory is accessible by the first processor and not by the second processor.

6. The system according to claim 1, wherein the first memory is accessible by the first processor and the second processor.

7. The system according to claim 1, wherein the second processor is of smaller size than the first processor.

8. The system according to claim 1, wherein the first processor comprises a first number of transistors and the second processor comprises a second number of transistors, the second number of transistors being less than the first number of transistors.

9. The system according to claim 3, wherein the second peripheral device is configured to provide the second interrupt signal to the first processor and not to the second processor.

10. A method for operating a system comprising a first processor, a second processor, a first memory, and a first peripheral device, the method comprising:
    selecting, as a selected processor and by a power management circuit, a first processor configured to process a first suite of instructions or a second processor configured to process a subset of the first suite of instructions;
    activating or placing on standby, by the power management circuit, the selected processor;
    generating, by a first peripheral device, a first interrupt signal;
    directing, by a switch, the first interrupt signal to the selected processor;
    accessing, by the selected processor, a first interrupt routine stored in the first memory and associated with the first interrupt signal;
    accessing, by the first processor, in response to the first interrupt signal, an interrupt vector stored in a second memory, different from the first memory, the interrupt vector providing an address, in the first memory, of the first interrupt routine, wherein the second memory is configured to store data to be copied in the first memory, the data comprising the first interrupt routine and the interrupt vector providing the address of the first interrupt routine associated with the first peripheral device; and
    copying the first interrupt routine and the interrupt vector from the second memory to the first memory in response to a system boot.

11. The method according to claim 10, further comprising processing, by the selected processor, the first interrupt routine.

12. The method according to claim 10, wherein the first processor is the selected processor.

13. The method according to claim 12, wherein the second memory is accessible by the first processor and not by the second processor.

14. A system, comprising:
    a first processor configured to process a suite of instructions;
    a second processor configured to process a subset of the suite of instructions;
    a first peripheral device configured to generate a first interrupt signal;
    a switch comprising a first output coupled to the first processor and a second output coupled to the second processor, the switch being configured to direct the first interrupt signal to a selected one of the first processor or the second processor based on a control signal;
    a second peripheral device configured to provide a second interrupt signal to the first processor;
    a first memory configured to store a first interrupt routine associated with the first interrupt signal, the selected one of the first processor or the second processor being configured to execute the first interrupt routine in response to the first interrupt signal; and
    a second memory accessible by the first processor and configured to store an interrupt vector providing an address, in the first memory, of the first interrupt routine associated with the first peripheral device, wherein the second memory is configured to store data to be copied in the first memory, the data comprising the first interrupt routine and the interrupt vector providing the address of the first interrupt routine associated with the first peripheral device, and wherein the first interrupt routine and the interrupt vector are copied from the second memory to the first memory in response to a system boot.

15. The system according to claim 14, further comprising a power management circuit configured to provide the control signal to the switch.

16. The system according to claim 14, wherein the second memory is accessible by the first processor and not by the second processor.

17. The system according to claim 14, wherein the first processor comprises a main processor of the system, and wherein the second processor comprises an auxiliary processor of the system.

18. The system according to claim 14, wherein the second peripheral device is configured to provide the second interrupt signal to the first processor and not to the second processor.

19. The system according to claim 14, further comprising a micro-controller comprising the first processor, the second processor, and the switch.

20. The system according to claim 15, wherein the control signal is indicative of which one of the first processor or the second processor is an activated processor.

21. The system according to claim 20, wherein the switch is configured to direct the first interrupt signal to the activated processor.

* * * * *